United States Patent [19]
Nikolaidis et al.

[11] Patent Number: 6,132,623
[45] Date of Patent: *Oct. 17, 2000

[54] IMMOBILIZATION OF INORGANIC ARSENIC SPECIES USING IRON

[75] Inventors: Nikolaos P. Nikolaidis, Storrs; Gregory M. Dobbs, Glastonbury; Jeffrey A. Lackovic, Gales Ferry, all of Conn.

[73] Assignee: The University of Connecticut, Storrs, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/100,177

[22] Filed: Jun. 18, 1998

Related U.S. Application Data

[60] Provisional application No. 60/050,250, Jun. 19, 1997, provisional application No. 60/067,229, Dec. 2, 1997, and provisional application No. 60/126,421, Jan. 29, 1998.

[51] Int. Cl.[7] .................................... C02F 1/70
[52] U.S. Cl. .................. 210/719; 210/747; 210/757; 210/911; 423/601
[58] Field of Search ..................... 210/719, 714, 210/747, 757, 911, 912; 423/87, 601, 602

[56] References Cited

U.S. PATENT DOCUMENTS

| | | | |
|---|---|---|---|
| 4,548,718 | 10/1985 | Muir | 210/719 |
| 4,565,633 | 1/1986 | Mayenkar | 210/688 |
| 4,888,053 | 12/1989 | Grayson et al. | 210/754 |
| 5,123,956 | 6/1992 | Fernandez et al. | 75/423 |
| 5,149,437 | 9/1992 | Wilkinson et al. | 210/665 |
| 5,252,003 | 10/1993 | McGahan | 405/128 |
| 5,266,213 | 11/1993 | Gillham | 210/747 |
| 5,358,643 | 10/1994 | McClintock | 210/709 |
| 5,362,394 | 11/1994 | Blowes et al. | |
| 5,391,305 | 2/1995 | Haitko | 210/757 |
| 5,431,825 | 7/1995 | Diel | 210/719 |
| 5,447,639 | 9/1995 | Sivavec | 210/747 |
| 5,514,279 | 5/1996 | Blowes et al. | 210/617 |
| 5,534,154 | 7/1996 | Gillham | 210/668 |
| 5,543,059 | 8/1996 | Howson et al. | 210/757 |
| 5,556,447 | 9/1996 | Srinivasachar et al. | 75/670 |
| 5,591,346 | 1/1997 | Etzel et al. | 210/668 |

FOREIGN PATENT DOCUMENTS

| | | |
|---|---|---|
| 1067627 | 12/1979 | Canada. |
| 2100288 | 12/1997 | Russian Federation. |

*Primary Examiner*—Frank M. Lawrence
*Attorney, Agent, or Firm*—Cantor Colburn LLP

[57] ABSTRACT

In a method for the remediation of inorganic arsenic species, a solution of inorganic arsenic is passed over zero valent iron under abiotic and anaerobic conditions, thereby removing the inorganic arsenic species and forming arsenic-metal co-precipitates. The metal is preferably in the form of iron filings, and is provided together with sand.

31 Claims, 11 Drawing Sheets

IMMOBILIZATION OF INORGANIC ARSENIC SPECIES USING IRON

CROSS-REFERENCE TO RELATED APPLICATIONS

This application claims priority to U.S. Prov. Appl. No. 60/050,250 filed Jun. 19, 1997; U.S. Prov. Appl. No. 60/067, 229 filed Dec. 2, 1997, and the U.S. Prov. Appl. No. 60/126,421 filed Jan. 29, 1998 by the same inventors hereof; all of which are herein incorporated by reference in their entirety.

BACKGROUND OF THE INVENTION

1. Field of the Invention

The present invention relates to the cleaning or purifying of contaminated water or soil. More particularly, this invention relates to a method both in-situ and ex-situ treatment for the immobilization of inorganic arsenic species, such as arsenates and arsenites using zero valent metals.

2. Brief Description of the Related Art

The present invention relates to the treatment of water or soils containing hazardous or undesirable compounds and more particularly relates to a system for the treatment of water or soils containing arsenic contaminants. Arsenic is a metaloid element that has been notorious for its toxicity. It is a group 5A nonmetal found in nature in the −3, 0, +3, and +5 oxidation states. Arsenic is found naturally as a main component of several minerals such as arsenopyrite, which is a white to steel-gray mineral found in crystalline rock. Over the years, arsenic has been used for a variety of purposes in the medical field, the cosmetic industry, and in agriculture. In the area of agriculture, arsenic-containing compositions have been used as insecticides, and are still used as desiccants, rodenticides, and herbicides. Arsenic also has been used in industrial applications involving the doping of solid state devices, as a laser material, in bronzing, and the like. Furthermore, arsenic can also be found in coal and coal combustion by-products.

A concern with the use of arsenic-containing compositions is their toxicity. Problems relating to contamination of water and soils with heavy metals such as arsenic has become increasingly evident in recent years. Heavy metals form poisonous compounds which, when taken into the human body, cause or are suspected to cause a variety of severe health problems including cancer, neurological impairment and birth defects. The use of arsenic as a component of herbicides has led to contamination at landfills and along railroad trails where the herbicides are applied. Arsenic contamination is also prevalent at gasoline transfer stations, chemical waste dump sites, areas around mining activities, and smelters, metal finishing/plating/electronics sites, wood treating sites, pharmaceutical manufacturing sites, and oil and solvent recycling sites. In addition, naturally occurring mineral deposits containing arsenic can contaminate drinking water supplies.

In response to the contamination of water and soils by heavy metals such as arsenic, the United States Environmental Protection Agency (EPA) and others have developed standards for the permissible level of heavy metals that may be present in drinking water and other types of water and soils. Various state and federal governmental bodies are responsible for promulgating specific criteria for remediation standards for arsenic. For example, the State of Connecticut's water quality and remediation standards for arsenic are a surface water protection criteria of 4 $\mu$g/L; a ground water protection criteria and drinking water standards of 50 $\mu$g/L; a GA pollutant mobility criteria of 50 $\mu$g/L; a GB pollutant mobility criteria of 500 $\mu$g/L; a residential direct exposure criteria of 10 mg/Kg; and industrial direct exposure criteria of 10 mg/Kg. Such increasingly stringent standards for heavy metal contamination highlights the need for effective and economical remediation methods.

Inorganic arsenic species exist in a variety of forms at contaminated sites. For example, inorganic arsenic species in contaminated industrial sites exist in the arsenate form (oxidation state=V), arsenite form (oxidation state=III), as arsenic sulfide ($HArS_2$), elemental arsenic ($As^0$) and arsine gas ($AsH_3$) (oxidation state=III). The arsenate forms include $H_3AsO_4$, $H_2AsO_4^-$, $HAsO_4^{-2}$ and $AsO_4^{-3}$. Arsenite forms include $H_3AsO_3$, $H_2AsO_3^-$, $HAsO^{-2}$, and $AsO_3^{-3}$. Arsenite (III) and arsenate (V) are the most common forms found in drinking water and waste water streams.

Systems for treating contaminated water and contaminated soil are known in the art. One of the well-known conventional systems for removing contaminants from water is to pass the contaminated water through a body of activated carbon. Activated carbon is a highly absorptive material, such that the dissolved contaminants are removed from the water and retained on the activated carbon. Over periods of time, the contaminant builds up on the activated carbon. After significant build up of the contaminant on the activated carbon, the carbon may be removed and disposed, flushed or otherwise treated (regenerated) to remove the contaminant. The drawback with such a system is that the contaminant still remains intact and hazardous.

Other existing systems for removing arsenic from drinking water include adsorption onto activated alumina within a fixed bed contractor; complexing arsenic with hydrous metallic floc, primarily aluminum and iron hydroxides or oxyhydroxides, in conventional water treatment plants; sieving the metal from water by membrane technologies using inverse osmosis; and electro-dynamic processes such as electrodialysis. Despite the existing systems, there remains a need for an economical, safe method to remove arsenic from water sources and from soil sites, such as landfills. In particular, there is a need for a system for in-situ immobilization of inorganic arsenic species, such that the arsenic species are broken down into harmless, or at least less hazardous, chemical substances.

SUMMARY OF THE INVENTION

The above-described and other problems and deficiencies of the prior art are overcome or alleviated by the arsenic immobilization method of the present invention, wherein an aqueous solution of inorganic arsenic species is passed over a substrate comprising a zero valent metal under anaerobic conditions, thereby reducing the arsenic species and forming arsenic-metal coprecipitates. Preferably the zero valent metal particles are mixed with a sand component to achieve the desired permeability. In a preferred embodiment, the zero valent metal is iron filings, which reduce the inorganic arsenic species to iron coprecipitates, mixed precipitates, and in conjunction with sulfates to arsenopyrites.

The method may be employed in the treatment of arsenic contaminants found both in water and soil sites: (1) as part of an in-situ permeable wall groundwater treatment system, (2) ex-situ as part of a groundwater extraction and treatment system (pump and treat), (3) ex-situ drinking water system, and (4) ex-situ treatment of a wastewater discharge containing arsenic. The versatility of this method of treatment is commercially attractive, efficient, and easily managed, and is particularly suitable for arsenic remediation in on-site treatment of ground water, in-situ ground water remediation (permeable walls), unsaturated soil remediation, drinking water remediation, and lake sediment seep remediation.

BRIEF DESCRIPTION OF THE DRAWINGS

For the purpose of illustrating the invention, there are shown in the drawing forms which are presently preferred; it being understood, however that this invention is not limited to the precise arrangements and instrumentalities shown. Referring now to the drawings wherein like elements are numbered alike in the several FIGURES.

DETAILED DESCRIPTION OF THE INVENTION

Figure 1:
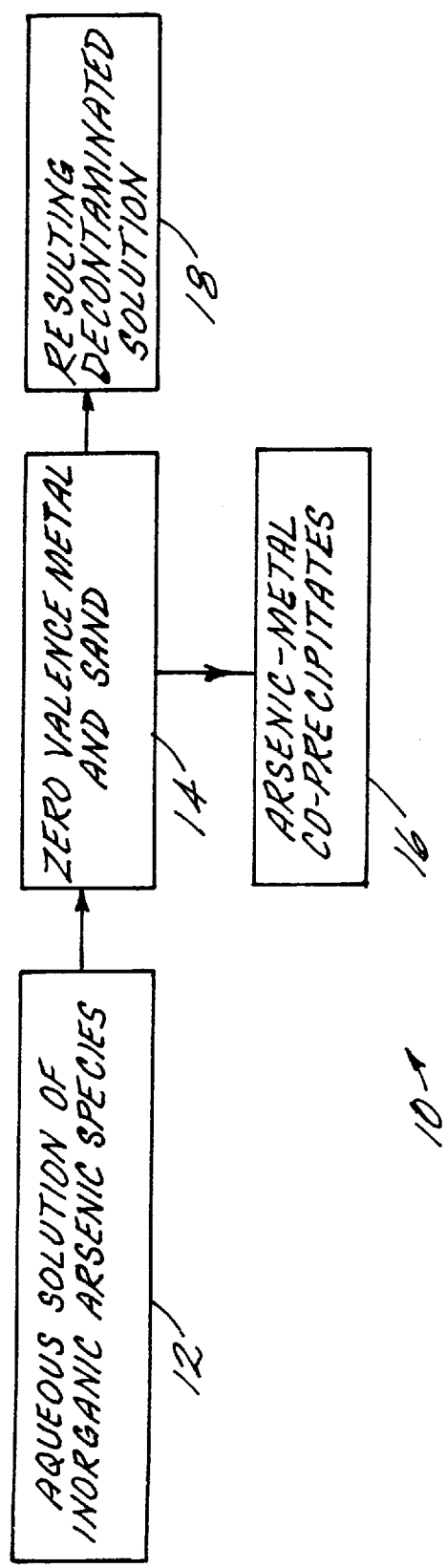
FIG. 1 is a schematic diagram of the immobilization of inorganic arsenic species according to the method of the present invention.

The present invention is directed to a new and improved method for the immobilization of inorganic arsenic species such as arsenates and arsenites by a zero valent metal and other optional dissolved inorganic chemicals. In accordance with the present invention, an aqueous solution of inorganic arsenic species is passed over a substrate comprising a zero valent metal, preferably iron, thereby reducing the inorganic arsenic species and forming arsenic-metal co-precipitates and mixed precipitates. The aqueous solution may further comprise other minority components to control porosity or chemistry. Furthermore, in accordance with the present invention, the aqueous solution may be first passed over barite to provide sulfate ions prior to passing the solution over the substrate comprising the zero valent metal. When the method of the present invention includes this optional first step, then the arsenic species might also be reduced by iron to arsenopyrites precipitates. This process is an abiotic process, and does not require the presence of microbes or other biotic agents.

In some embodiments of the present invention, inorganic arsenic-contaminated water is passed over a sulfate source (barite) or spiked with equivalent sulfate concentrations to produce an aqueous solution. The aqueous solution of the inorganic arsenic species passes over a substrate comprising a zero valent iron in the form of iron filings and sand in the ratio of 1:1 by weight. This iron/sand substrate acts as a "filter" and removes most or substantially all of the inorganic arsenic species from the solution.

Without being bound by theory, immobilization of arsenic by zero valent iron occurs as follows. Elemental iron in the presence of aqueous solution can be oxidized both aerobically and anaerobically providing electron(s) for the reduction of other redox sensitive chemical species such as arsenate and sulfate. First, elemental iron oxidizes to ferrous iron (Fe(II)) in the presence of oxygen. For, the system under aerobic conditions, oxygen is thus consumed according to the reaction:

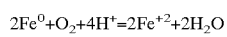

$$2Fe^0 + O_2 + 4H^+ = 2Fe^{+2} + 2H_2O$$

This reaction removes most or all of the oxygen in the aqueous solution, simultaneously resulting in a temporary reduction in the pH of the solution. When all or substantially all of the oxygen is consumed, the aqueous solution becomes anaerobic. Under anaerobic conditions, iron oxidization is then coupled with the hydrolysis of the water, sulfate reduction and arsenate reduction as follows:

$Fe^0 = Fe^{+2} + 2e^-$ (iron oxidation) (I)

$Fe^{+2} = Fe^{+3} + e^-$ (iron oxidation) (II)

$8e^- + 9H^+ + SO_4^{-2} = HS^- + 4H_2O$ (sulfate reduction) (III)

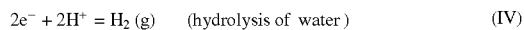

$2e^- + 2H^+ = H_2(g)$ (hydrolysis of water) (IV)

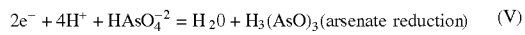

$2e^- + 4H^+ + HAsO_4^{-2} = H_2O + H_3(AsO)_3$ (arsenate reduction) (V)

As the reactions proceed, the products of these reactions form precipitates that include the formation of $Fe(OH)_3$, $FeAsO_4$, FeAsS, and other species. The inorganic arsenic species may also be removed from the aqueous solution through the formation of coprecipitates, mixed precipitates and by adsorbing onto the ferric hydroxide solids.

In one embodiment of the present invention, especially suitable for in-situ ground water remediation, contaminated water containing an arsenic species is passed, under anaerobic conditions, over a substrate comprising a zero valent metal such as iron and sand. The zero valent metal reduces the inorganic arsenic contaminants to metal co-precipitates and mixed precipitates. Optionally, the contaminated water may be first passed over barite, thereby providing sulfate ions. The presence of sulfate ions when the inorganic arsenic solution and iron filings/sand are co-mingled allows reduction of the inorganic arsenic species to arsenopyrites.

In another embodiment, the method of the present invention comprises providing a first aqueous solution of inorganic arsenic species, providing a second aqueous solution of oxidized metal species, and co-mingling the first aqueous solution with the second aqueous solution under anaerobic conditions. Preferably, the oxidized metal ions are ferrous and ferric ions and the second solution of metal ions is derived from the oxidation of a substrate comprising at least one zero valent metal.

By way of further explanation of the invention, a further embodiment of the invention is shown in FIG. 1, which is a schematic diagram of the system 10 for immobilization of inorganic arsenic species according to a method of the present invention. The inorganic arsenic species is provided as an aqueous solution 12, which may comprise arsenates, arsenites or mixtures thereof. Aqueous solution 12 passes through a substrate 14 which acts as a filter and removes the arsenic species from aqueous solution 12, forming arsenic-metal co-precipitates 16 under anaerobic conditions. Substrate 14 comprises a zero valent metal and preferably further comprises sand. The zero valent metal and sand are provided in a ratio of about 1:1 by weight. Preferably, the zero valent metal is iron in the form of filings. When the method of the present invention is applied to a groundwater site and the system 10 and the water itself lie below the water table, it can be expected that the natural conditions will therefore be substantially anaerobic. The resulting decontaminated solution 18 has arsenic concentrations substantially reduced from aqueous solution 12 and the inorganic arsenic species have been reduced to a more environmental acceptable form.

Figure 2:
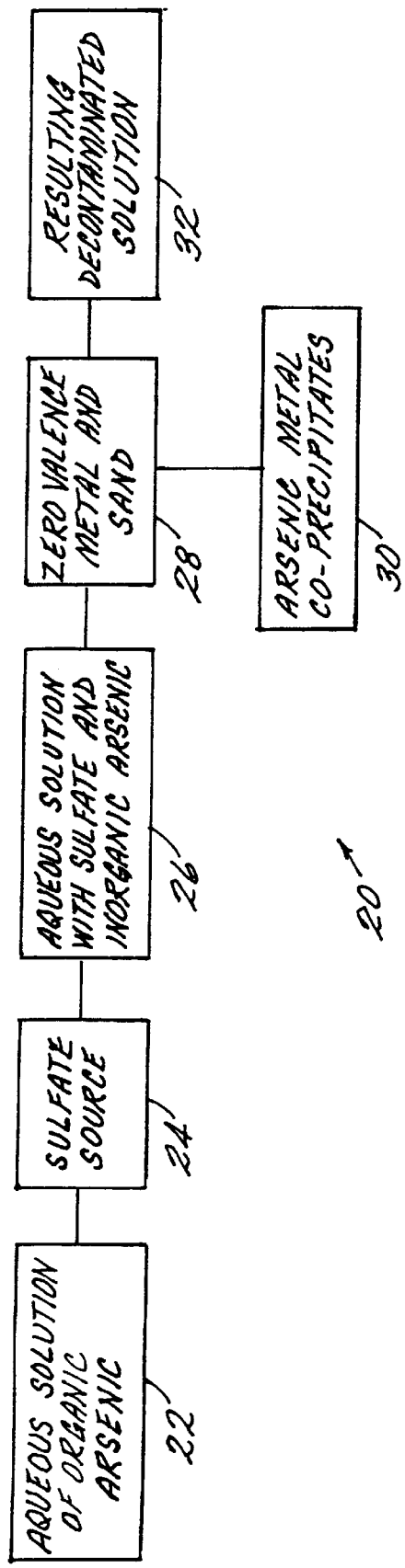
FIG. 2 is a schematic diagram of the immobilization of inorganic arsenic species according to the method of the present invention wherein the method includes first passing a inorganic arsenic species solution over a barite source.

Now turning to FIG. 2 which illustrates system 20, the inorganic arsenic species is provided as an aqueous solution 22 comprising arsenates, arsenites or mixtures thereof. The aqueous solution 22 passes first over a source of sulfate ions 24, such as barite. The aqueous solution with sulfate ions 26 passes through a substrate 28 which acts as a filter and removes the arsenic species from the aqueous solution 22. Substrate 28 comprises a zero valent metal, preferably iron, and preferably further comprises sand. The zero valent metal and sand are provided in a ratio of 1:1 by weight. The zero valent metal and sand substrate 28 reduces aqueous solution 22 forming arsenic-metal co-precipitates 30, including arsenopyrites under anaerobic conditions. When the method of the present invention is applied to a groundwater site and the system 20 and the water itself lie below the water table, it can be expected that the natural conditions will therefore be substantially anaerobic. The resulting decontaminated solution 32 has arsenic concentrations substantially reduced from aqueous solution 22 and the inorganic arsenic species have been reduced to a more environmentally acceptable form.

One advantage of the present invention is that it can be practiced in different settings. For instance, the method of this invention can be practiced in-situ without the removal of the contaminated water from the ground, pond, or stream. Contaminants can be immobilized in place because the reaction products are environmental acceptable and need not be removed. Additionally, this invention can be practiced ex-situ by various methods, including but not limited to, batch processes or passing the contaminated solution through a column. In batch processing, the contaminated aqueous composition is treated in a separate container by admixing the reagents with the contaminated solution. In column treatment, a zero valent metal, such as iron filings, and sand are packed as a reactive substrate in the column while the contaminated solution is passed through the column. The passing of the aqueous solution over barite before feeding it into the column is optional depending upon the desired co-precipitates.

Figure 3:
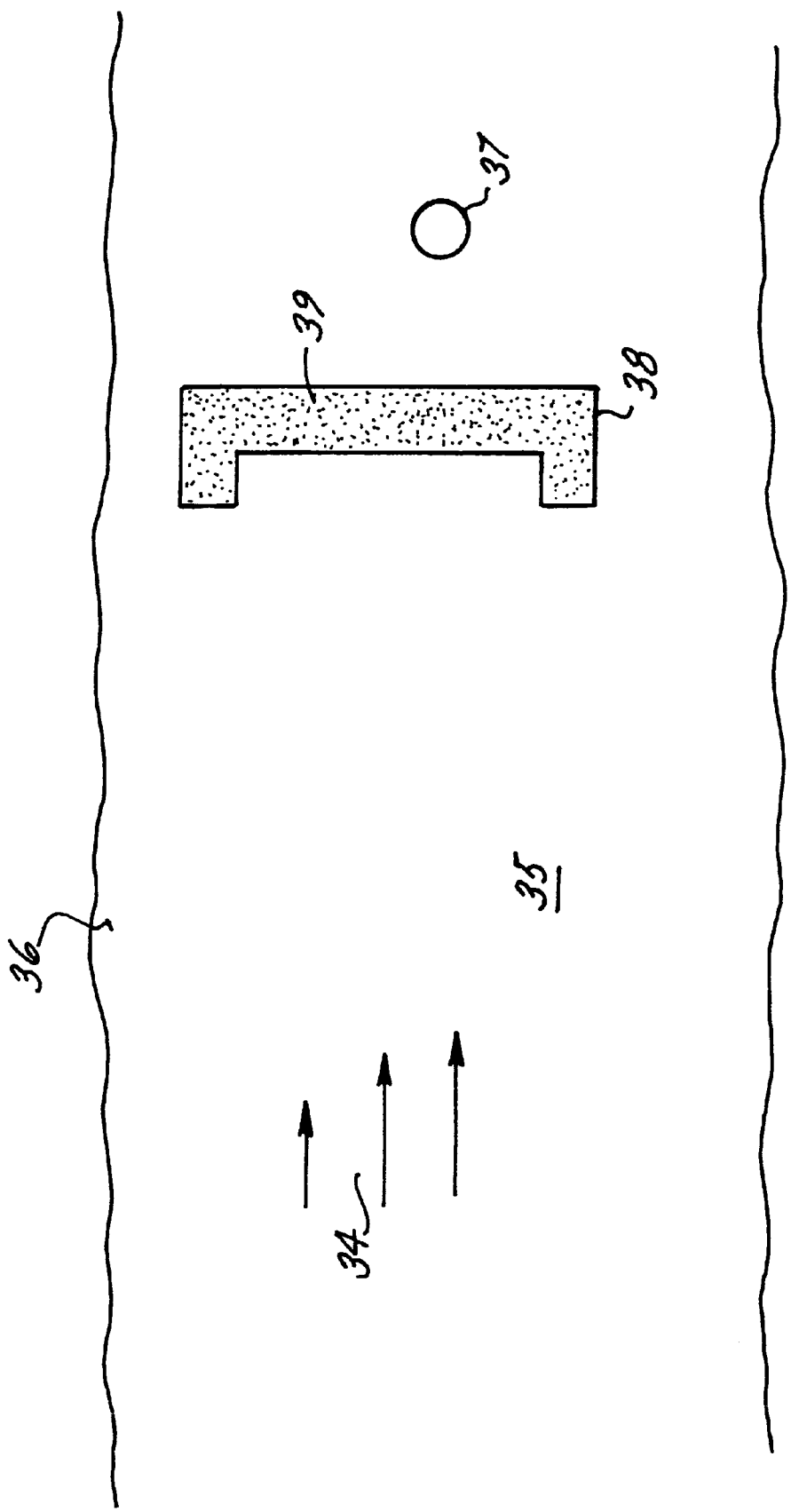
FIG. 3 is a plan view of a region of an aquifer, in which a body of a arsenic contaminant is being immobilized by means of a process which embodies the invention.

FIG. 3 shows a body of arsenic contaminated water 34 which has entered an aquifer 35 and is contaminating the groundwater 36. The permeability of the aquifer 35 is such that the contaminant is able to move through the aquifer in a particular direction, thus forming a plume of contaminant. If it is discovered that the plume is directing toward a drinking water source 37 such as a well or pumping station, it becomes economically and environmentally worthwhile to take steps to prevent the drinking water source from being contaminated.

A trench 38 is excavated in the path of the plume, and a body 39 of mixed iron filings and sand is placed in trench 38. Body 39 in trench 38, is dimensioned such that substantially all of the plume must flow through body 39. Body 39 should not constitute a barrier to the flow of water; therefore, the permeability of the iron-sand mixture should be no lower than that of the aquifer itself. There should be no liner present between body 39 and the material of aquifer 35, or at least none which would reduce the permeability of the trench. Also, any shoring used to support the trench, during excavation, should be removed once body 39 is in place.

The dimensions of trench 38 and the amount of iron filings and sand employed as a substrate to be placed in trench 38 should be effective to ensure adequate residence time of the contaminated groundwater in contact with the iron filings and sand substrate, which in turn is empirically determined by such factors as the flow rate of the plume, the initial concentration of the contaminating arsenic species, and the allowable final concentration of contaminating arsenic species. The iron and sand are placed in the trench.

Figure 4:
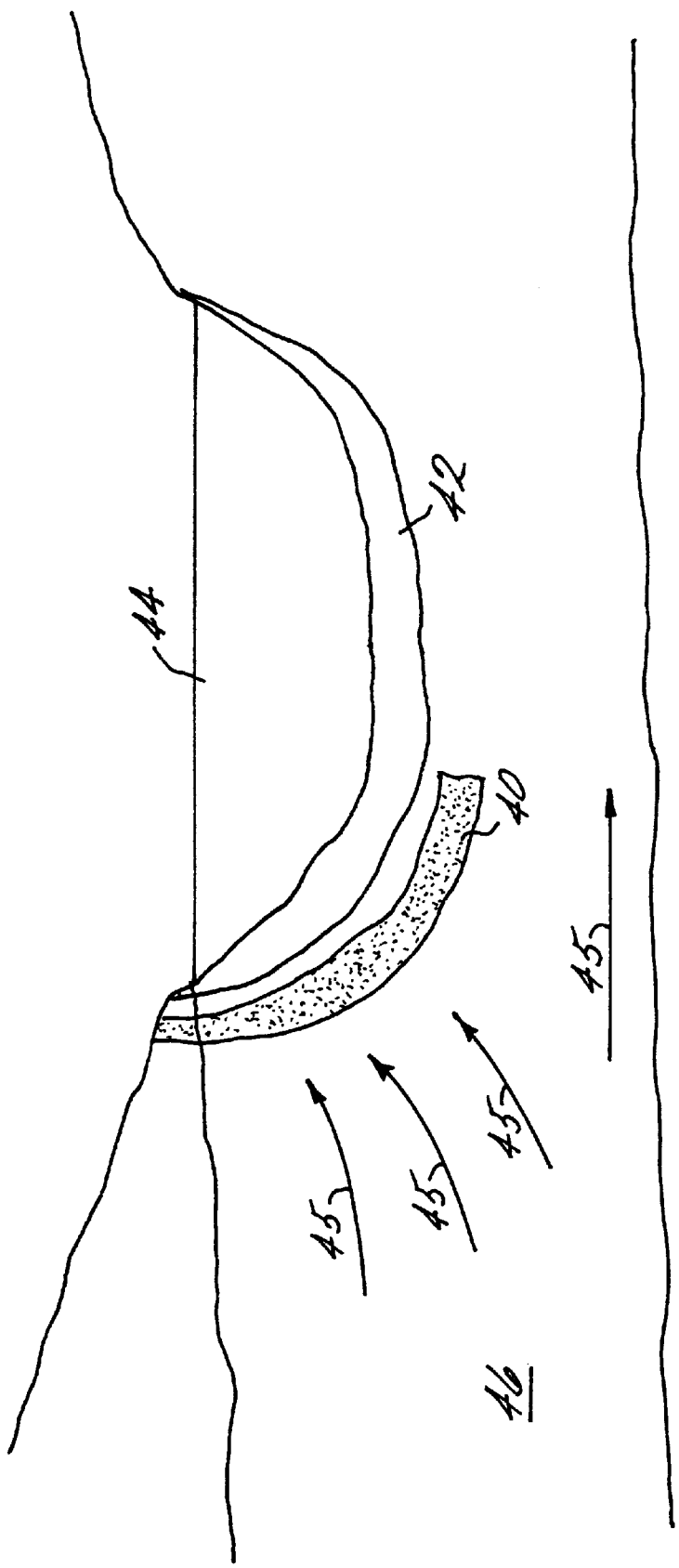
FIG. 4 is a diagram showing lake sediment remediation and protection of surface waters in accordance with the present invention.

FIG. 4 illustrates still another embodiment of the present invention, depicting lake sediment remediation. In accordance with the present invention, a layer of iron filing and sand 40 is placed under the sediment 42 of a lake 44. Arsenic contaminated ground water 46 is prevented from seeping into lake 44 by the iron filings and sand layer 40 which acts to intercept the natural progression, illustrated by directional arrows 45, of contaminated 46 into the lake 44. As the arsenic contaminated groundwater 46 passes into and through the iron filing and sand layer 40, arsenic is effectively removed from the groundwater. The dimensions of the iron filing and sand layer 40 and the amount of iron filings and sand therein are such as to provide an adequate residence time for effective removal of arsenic, which in turn is empirically determined by such factors as the flow rate of the contaminated groundwater, the initial concentration of the contaminating arsenic species, and the allowable final concentration of contaminating arsenic species. Such a system effectively protects surface waters from contaminated arsenic groundwater sites.

Figure 5:
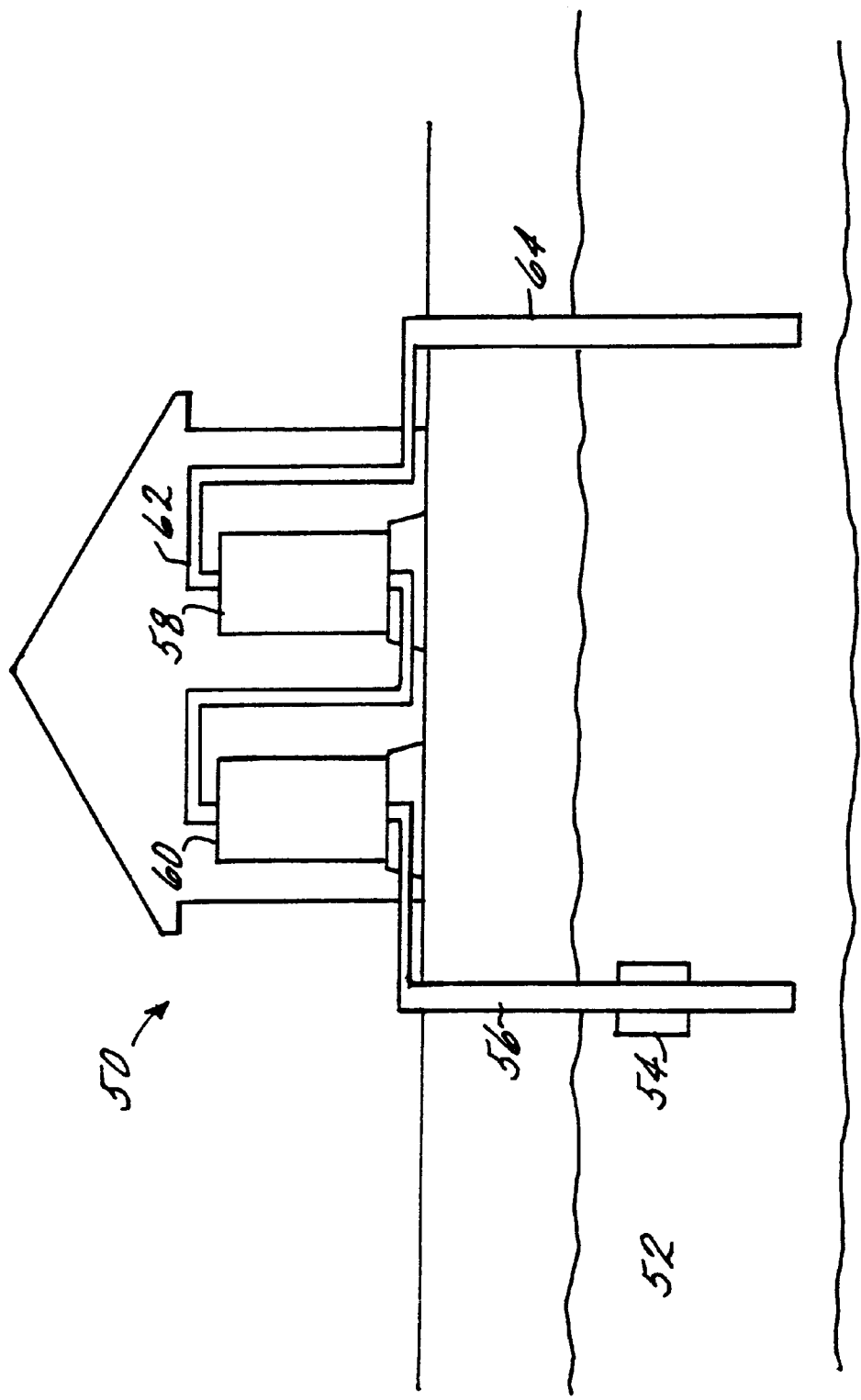
FIG. 5 is a diagram showing a pump-and-treat system in accordance with the present invention.

FIG. 5 illustrates a pump-and-treat system 50 utilizing the method of the present invention. The arsenic contaminated groundwater 52 is drawn out of the soil by means of a pumping device 54 wherein the contaminated water is pumped to an extraction well 56. The contaminated water pumped to a treatment processing system in accordance with the present invention. The treatment processing system comprises a body of iron filings and sand within a container 58 and optionally includes a sulfate source (preferably barite) within a second container 60. If a sulfate source is used in the process, the arsenic contaminated groundwater 52 is fed into second container 60 before being fed into the iron filings and sand container 60. Contaminated groundwater 52 slowly is allowed to percolate in both containers and the dimensions of the containers and the amount of iron filings and sand are such as to provide an adequate residence time for effective removal of arsenic, which in turn is empirically determined by such factors as the flow rate of the water, the initial concentration of the contaminating arsenic species, and the allowable final concentration of contaminating arsenic species. Water exits container 58 by means of an outlet pipe 62, from which the water is fed to an injection well 64 from which the water may then be placed back into an aquifer.

Figure 6:
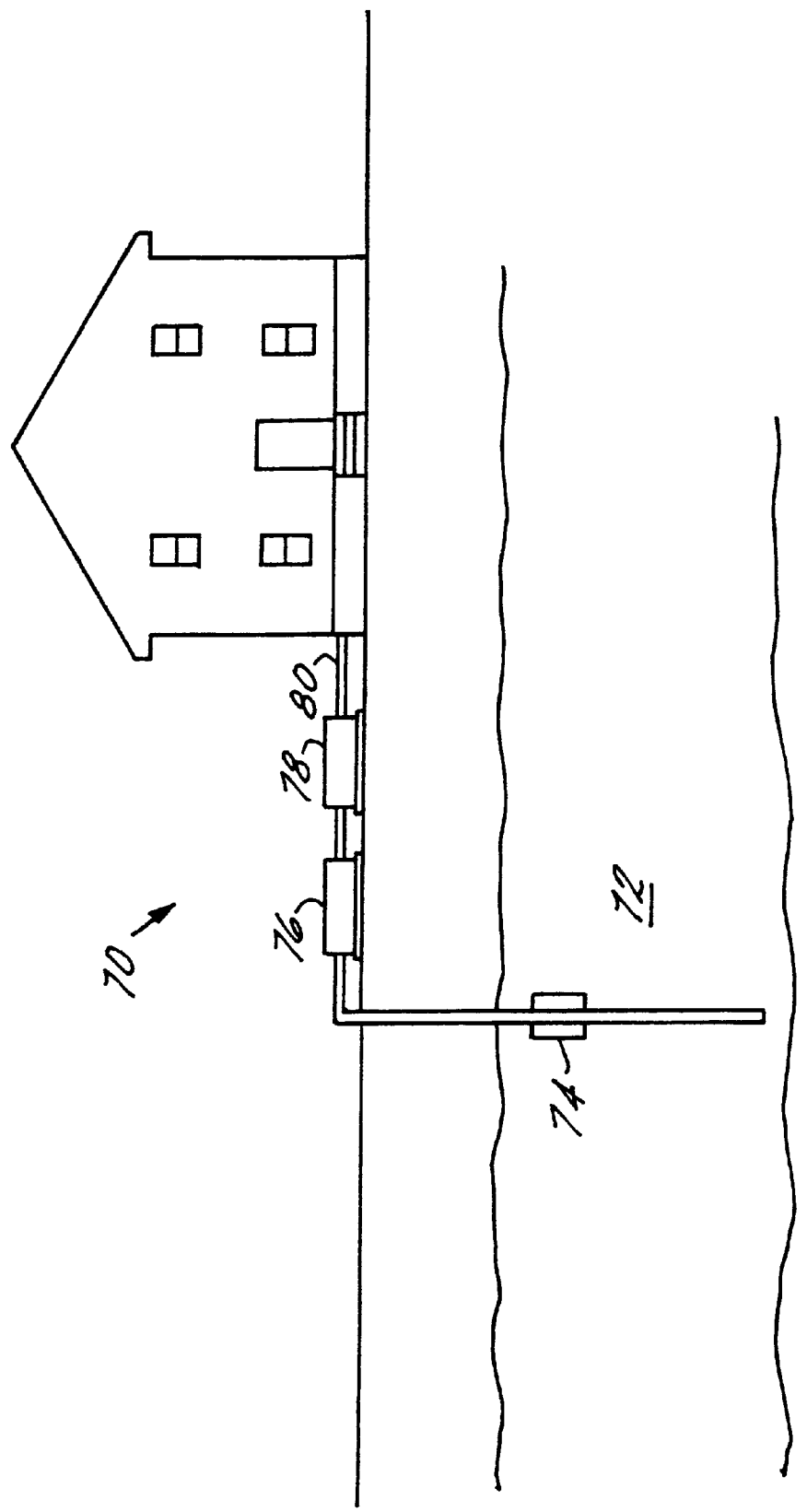
FIG. 6 is a diagram showing a drinking water supply system in accordance with the present invention.

Now turning to FIG. 6, in which a drinking water supply system 70 is treated in accordance with the present invention. The arsenic contaminated groundwater 72 is drawn out of the soil by means of a pumping device 74 and is fed into an optional container 76 having a sulfate source therein before being fed into container 78. Within container 78 is a body of iron filings and sand through which the water slowly percolates. The dimensions of container 76 and 78 and the amount of iron filings and sand are such as to provide an adequate time for effective removal of arsenic, which in turn is empirically determined by such factors as the flow rate of the water, the initial concentration of the contaminating arsenic species, and the allowable final concentration of contaminating arsenic species. Water exits container 78 by means of outlet pipe 80, from which the water is piped for residential use, for example in a residential house, as shown in FIG. 6.

The following non-limiting examples further describe the method for the immobilization of arsenic species in accordance with the present invention.

EXAMPLES

Example 1

Arsenate adsorption isotherm experiments were conducted using saturated zone sand taken from Maine and iron filings obtained from J. T. Baker, Inc. using standard bottle point techniques. Accordingly, 5.0 g of sand and 5.0 g of iron filings were mixed with 100 mL of 0.1M $NaNO_3$ and arsenate in a series of polyethylene bottles, each bottle having different concentration of arsenate in the range of 45 ppb to 8600 ppb. The different arsenate concentrations were prepared by adding an appropriate quantity of sodium arsenate stock solution to the constant ionic strength solution. A control experiment excluding the iron filings was also run, wherein the initial pH of the solution was adjusted to 6.7. The bottles were then placed on a rotary shaker at room temperature for seven days until equilibrium was reached. The pH in all bottles was allowed to drift throughout the experiment. After seven days, the supernatant was filtered through 0.45 micron nylon filter and analyzed for residual metals by graphite furnace atomic absorption spectroscopy (GFAAS).

Figure 7:
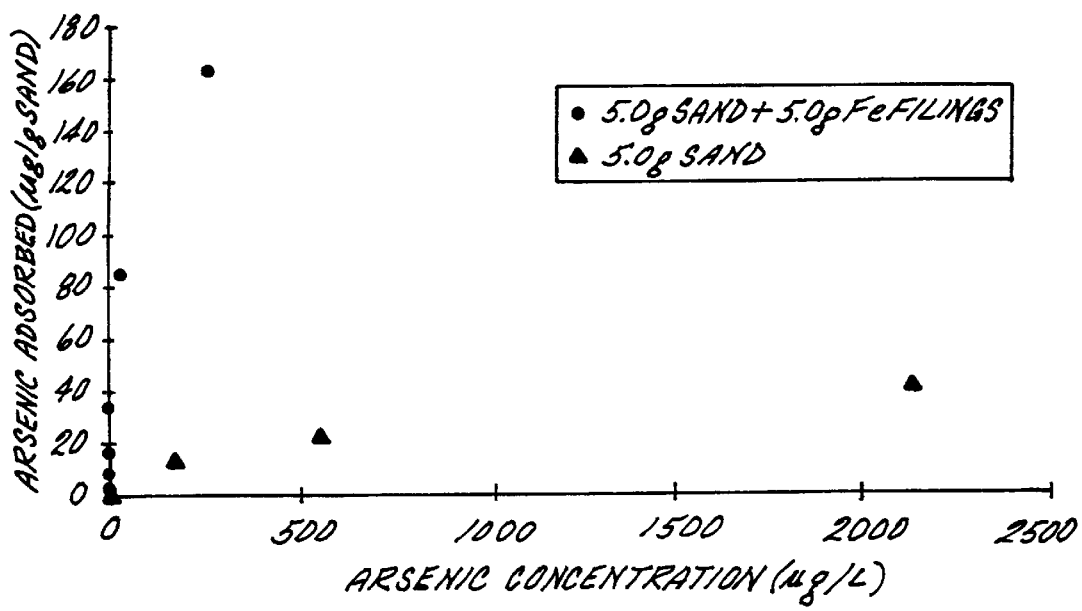
FIG. 7 illustrates an arsenate adsorption isotherm experiment using Maine sand and iron filings.

FIG. 7 presents the results. Use of Maine sand alone resulted in removal of between about 50 to 94% of the arsenic in solution, at initial arsenic concentrations in the range from 42 ppb to 4299 ppb. On the other hand, the combination of sand and iron filings in a ratio of 1:1 by weight resulted in removal greater than 97% of the arsenic in solution for all initial concentrations. In fact, for initial concentrations of less than 5000 ppb arsenate in solution, the results indicate that the final dissolved arsenate concentration will be less than 50 ppb, the drinking water standards.

Example 2

This experiment was conducted according to the procedure set forth in Example 1, using sand obtained from Iowa which contained calcereous material. The pH of the sand in solution was 9.0, and experiments were run on mixtures containing 10 g of sand, 10 g of iron filings and 200 mL of $NaNO_3$ spiked with arsenate at concentrations in the range from 0 to 20,000 ppb.

Figure 8:
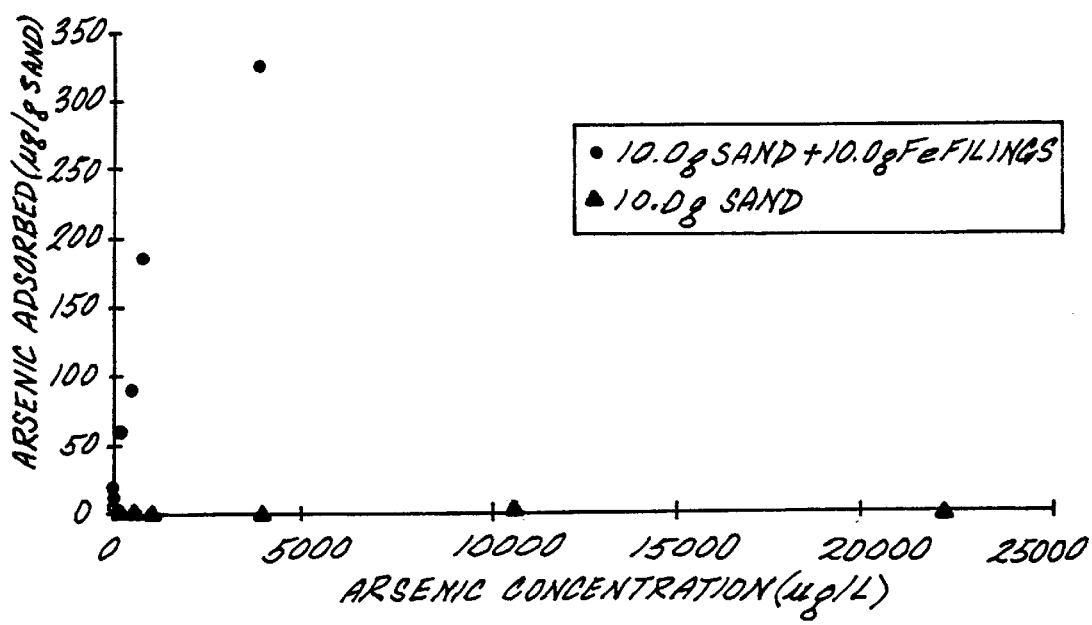
FIG. 8 illustrates an arsenate adsorption isotherm experiment using Iowa sand and iron filings.

The results are shown in FIG. 8. Use of Iowa sand alone resulted in no removal of any amount of arsenic from the solution. On the other hand, the combination of sand and iron filings in a ratio of 1:1 by weight removed greater than 81% of the arsenic in solution for all initial concentrations. In fact, for concentrations less than 2000 ppb in solution, the results indicate that final dissolved arsenate concentration will be less than drinking water standard for arsenic (50 ppb).

Example 3

Example 3 was conducted to evaluate the efficiency of the method of the present invention under conditions more closely related to subsurface environments. Thus, column experiments were conducted using iron filings (J. T. Baker, Inc.) and silica sand. An eluent solution containing 470 ppb of arsenate in 0.01M $NaNO_3$ solution was passed through the columns at a flow rate of 1.0 mL/minute.

Figure 9:
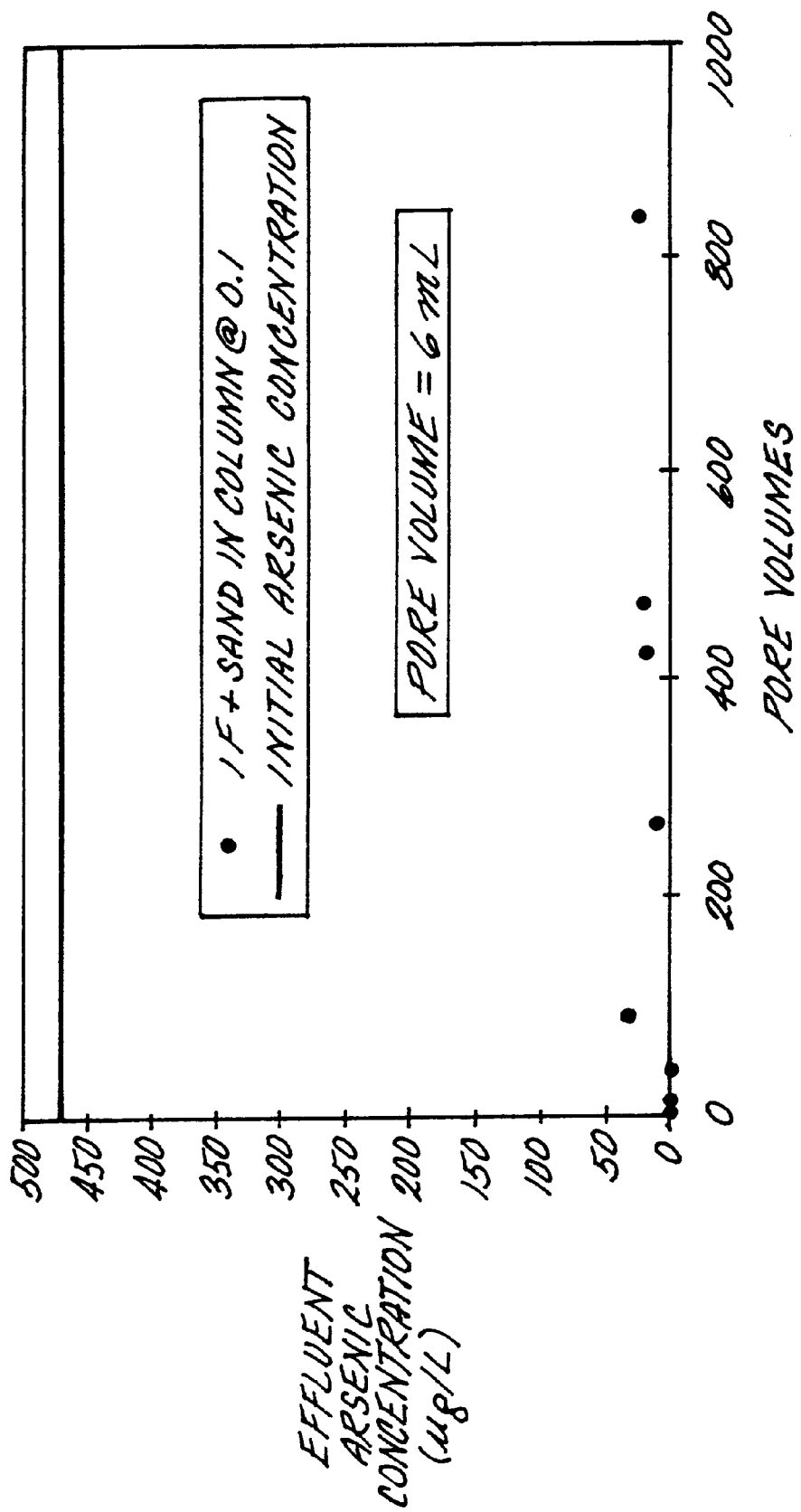
FIG. 9 illustrates a column study of the immobilization of arsenic using iron filings and silica sand, wherein the eluent solution contained 470 ppb arsenate in 0.01M $NaNO_3$.

The results are shown in FIG. 9. For the iron/silica column, the effluent arsenate concentration did not exceed 27 ppb throughout the course of the experiment. Importantly, the pore volume of this column was 6 mL, indicating that the column was flushed with more than 800 pore volumes of eluent.

Example 4

Example 4 represents a field test of the method of the present invention at an arsenic-contaminated site in Maine, and compares the effectiveness of 2.5 kg iron filings obtained from J. T. Baker, Inc., and 2.5 kg iron filings obtained from Connelly-GPM, Inc. in combination with 2.5 kg silica sand, and 2.5 kg silica sand alone.

Figure 10:
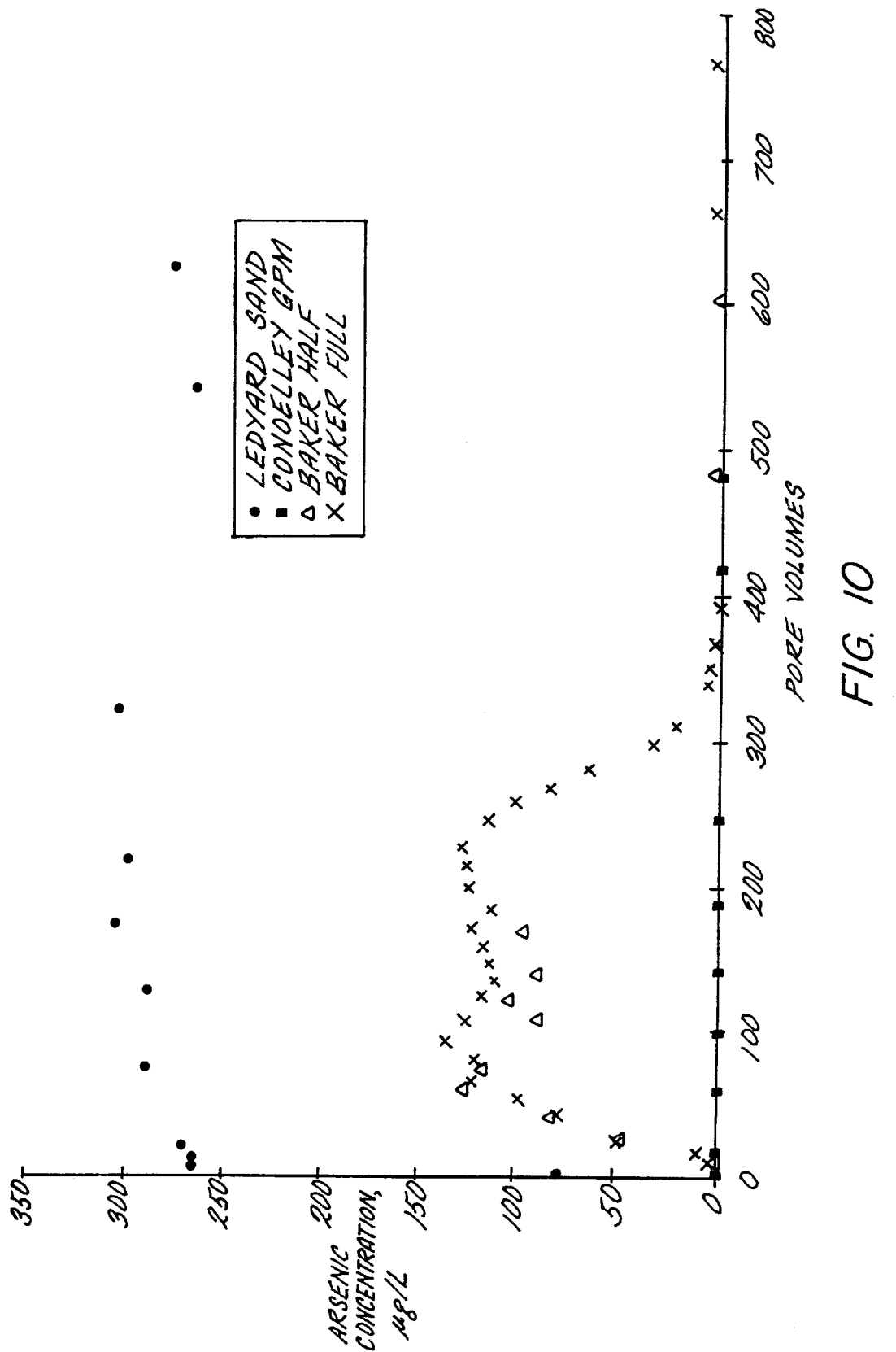
FIG. 10 illustrates the concentration of arsenic eluting from columns as a function of the pore volumes of water through the column for two types of iron filings (J. T. Baker, Inc. and Connelly-GPM, Inc.) and a control (silica sand)

FIG. 10 shows the concentration of arsenic in the column effluent as a function of the pore volume of water through the column over time (approximately two months). The results indicate that use of Connelly-GPM, Inc. iron filings resulted in removal of all detectable arsenic from the eluent. The J. T. Baker, Inc. filings initially resulted in removal of about 60% of the arsenic from the eluent, and after 350 pore volumes removed all detectable arsenic. Without being bound by theory, it is likely that the J. T. Baker, Inc. filings failed to remove all arsenic from the solution in the first 350 pore volumes because of the lower surface area of the J. T. Baker, Inc. filings (about 20 times less than that of the Connelly-GPM, Inc. filings). Corrosion of the J. T. Baker, Inc. iron filings passage of the first 350 pore volumes resulted in increasing the surface area of the filings, and thus the improved arsenic removal.

FIG. 10 also shows the effect of passing the eluent through different quantities of J. T. Baker, Inc. filings/sand, wherein a J. T. Baker, Inc. "full" iron filings column was 54 cm in length and a J. T. Baker, Inc. "half" iron filings column was 27 cm in length. The results indicate that the proposed technology can successfully treat arsenic contaminated aqueous solution to levels less than the drinking water standards.

Figure 11:
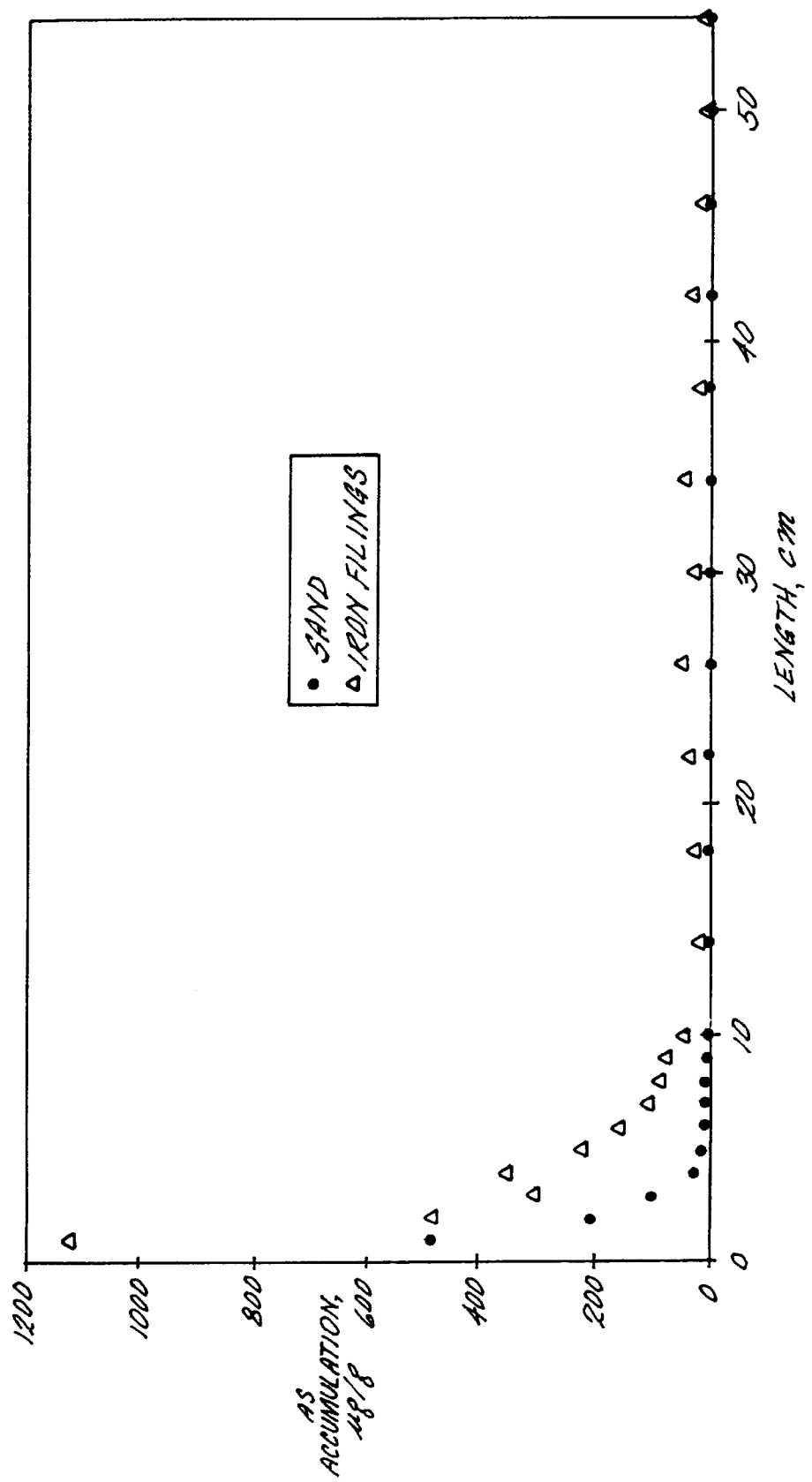
FIG. 11 illustrates the accumulated concentration of arsenic on the Connelly-GPM, Inc. iron filings column and sand.

FIG. 11 shows the accumulated concentration of arsenic associated with the stationary phase of the Connelly-GPM, Inc. iron filings/sand column. The results indicate that all arsenic removal occurred in the first 10 cm of the column.

Example 5

Figure 12:
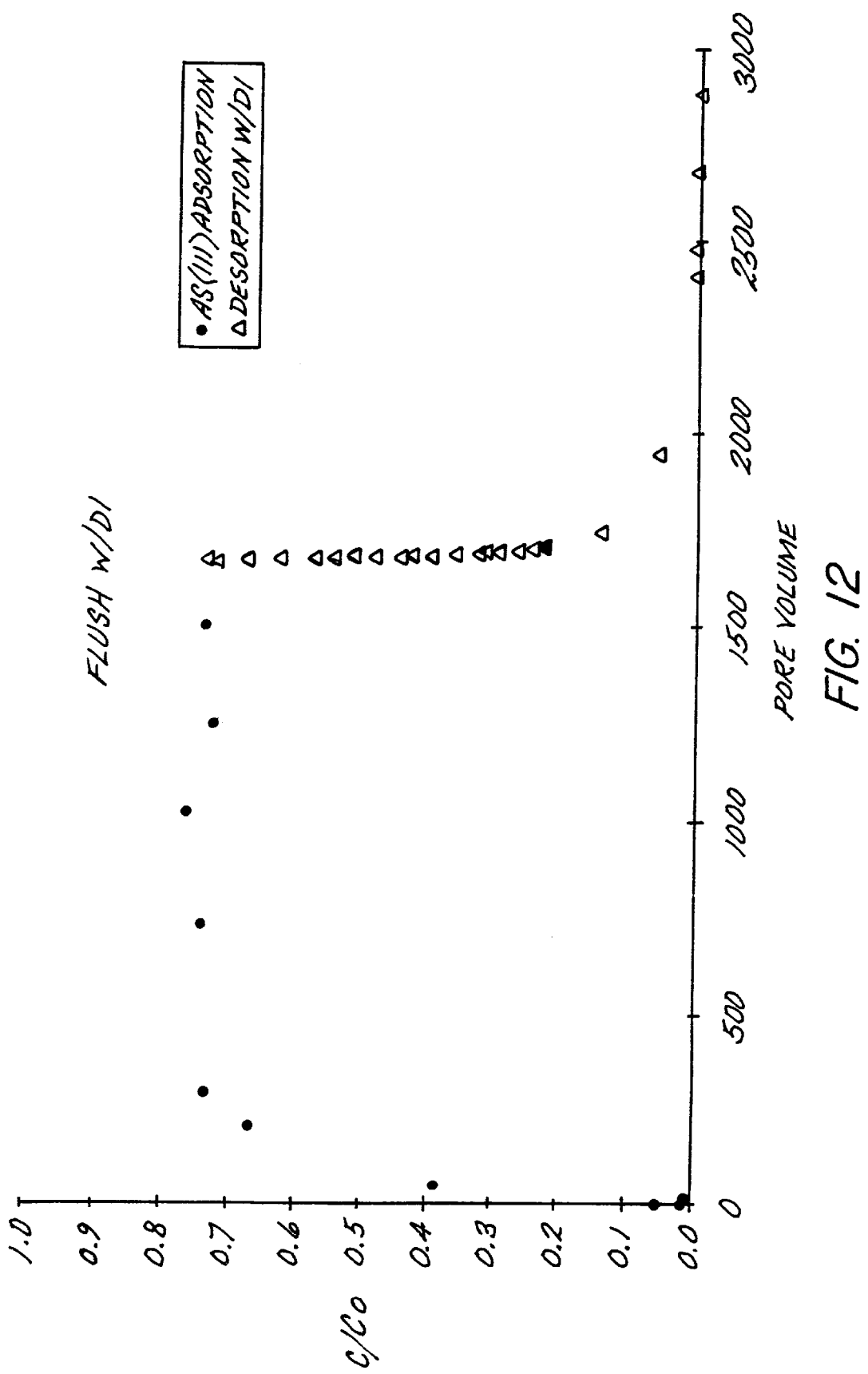
FIG. 12 illustrates the desorption of arsenic species using the method of the present invention.

Example 5 was designed to evaluate the desorption of arsenic from the iron filings. A column comprising 5 g iron filings and 5 g silica sand was eluted with a solution of 1000 ppb arsenite and 50 ppm sulfate in 0.01M $NaNO_3$ at a flow rate of 1.0 mL/minute. As shown in FIG. 12, the effluent arsenite concentration increased to 70% of the incoming eluent concentration within 400 pore volumes, and then stayed constant. Upon changing the eluent to 0.01M NaNO$_3$ (no arsenic), the arsenic desorbed. The concentration of arsenic desorbing from the column dropped by 500 ppb within 30 pore volumes, and to less than 10 ppb within 700 pore volumes. Overall, the desorption was less than 12% of the total arsenic adsorbed onto the column. The results indicate that arsenic on iron filings do not pose a significant long term disposal problem.

While preferred embodiments have been shown and described, various modifications and substitutions may be made thereto without departing from the spirit and scope of the invention. Accordingly, it is understood that the present invention has been described by way of illustrations and not limitation.

What is claimed is:

1. A method for the remediation of arsenic, comprising:
   providing an aqueous solution of inorganic arsenic species; and
   passing the solution of inorganic arsenic species over and through a substrate comprising zero valent iron fillings, thereby anaerobically and abiotically forming arsenic-iron co-precipitates.

2. The method in accordance in with claim 1, wherein the inorganic arsenic species comprise arsenates, arsenites, or mixtures thereof.

3. The method in accordance with claim 1, wherein the aqueous solution further comprises sulfate ions.

4. The method in accordance with claim 1, wherein the aqueous solution is first passed over a sulfate source, thereby providing sulfate ions.

5. The method of claim 4, wherein the sulfate source is barite.

6. The method of claim 1, wherein the substrate her comprises sand.

7. A method for the remediation of inorganic arsenic species contaminants from groundwater in an aquifer, comprising:
   providing a substrate comprising zero valent iron filings such that the substrate is permeable to the flow of the groundwater over and through the substrate and wherein the zero valent metal is not in contact with atmospheric oxygen; and
   passing the groundwater containing the inorganic arsenic species over and through the substrate so that the groundwater does not come in contact with atmospheric oxygen prior to entering the substrate and while it is passed through and over and through the substrate in contact with the zero valent metal, thereby anaerobically and abiotically forming arsenic-iron co-precipitates.

8. The method in accordance with claim 7, wherein the inorganic arsenic species comprise arsenates, arsenites, or mixtures thereof.

9. The method in accordance with claim 7, wherein the groundwater further comprises sulfate ions.

10. The method in accordance with claim 7, wherein the groundwater is first passed over a sulfate source, thereby providing sulfate ions.

11. The method in accordance with claim 9, wherein the sulfate source is barite.

12. The method in accordance with claim 7, further comprising:
    causing the groundwater to percolate through the substrate under anaerobic conditions and to remain in contact with the zero valent metal therein for a period of time to substantially remediate the inorganic arsenic species.

13. A method for the remediation of inorganic arsenic species in contaminated groundwater in an aquifer, comprising:
    excavating a trench in material of the aquifer whereby the excavated trench is in the path of the natural flow of the contaminated arsenic containing groundwater;
    disposing a substrate in the excavated trench, wherein the substrate comprises zero valent iron filings such that the substrate is permeable to the flow of the groundwater over and through the substrate and wherein the zero valent iron filings are not in contact with atmospheric oxygen; and
    passing the contaminated groundwater over and through the substrate so that the groundwater does not come in contact with atmospheric oxygen prior to entering the substrate and while it is passed over and through the substrate, thereby anaerobically and abiotically forming arsenic-iron co-precipitates.

14. The method in accordance with claim 13, wherein the substrate further comprises sand.

15. The method in accordance with claim 13, wherein the inorganic arsenic species comprise arsenates, arsenites, or mixtures thereof.

16. The method in accordance with claim 13, wherein the groundwater further comprises sulfate ions.

17. The method in accordance with claim 13, wherein the groundwater is first passed over a sulfate source, thereby providing sulfate ions.

18. The method in accordance with claim 17, wherein the sulfate source is barite.

19. The method in accordance with claim 13, further comprising:
    causing the groundwater to percolate over and through the substrate under anaerobic conditions and to remain in contact with the zero valent metal therein for a period of time to substantially remediate the inorganic arsenic species.

20. A method for the remediation of inorganic arsenic species in an aqueous solution, comprising:
    providing a remediation container having an inlet and an outlet;
    disposing a substrate comprising zero valent iron filings in the container, the substrate being permeable to the flow of the aqueous solution over and through the substrate and wherein the zero valent iron is not in contact with atmospheric oxygen;
    passing the aqueous solution into the remediation container by passing the aqueous solution through the inlet, the inlet and container being so arranged that the aqueous solution does not come into contact with atmospheric oxygen as it passes through the inlet and into the container; and
    passing the aqueous solution over and through the substrate, thereby anaerobically and abiotically reducing the arsenic species and forming arsenic-iron co-precipitates.

21. The method in accordance with claim 20, wherein the aqueous solution comprises contaminated drinking water.

22. The method in accordance with claim 20, wherein the inorganic arsenic species comprise arsenates, arsenites, or mixtures thereof.

23. The method in accordance with claim 20, wherein the substrate further comprises sand.

24. The method in accordance with claim 20, wherein the aqueous solution further comprises sulfate ions.

25. The method in accordance with claim 20, wherein the aqueous solution is first passed over a sulfate source, thereby providing sulfate ions.

26. The method in accordance with claim 25, wherein the sulfate source is barite.

27. The method in accordance with claim 20, wherein the remediated aqueous solution is passed through the outlet and transported to a residence for use as residential drinking water.

28. A method for the remediation of arsenic, comprising:
providing an aqueous solution of inorganic arsenic species; and
passing the solution of inorganic arsenic species over and through a substrate comprising zero valent iron thereby oxidizing the metal to provide iron ions, whereby the arsenic species and the metal ions form arsenic-iron co-precipitates anaerobically and abiotically.

29. The method in accordance with claim 28, wherein the aqueous solution further comprises sulfate ions.

30. The method in accordance with claim 29, further comprising:
the sulfate ions are derived by passing the aqueous solution over barite prior to contacting it with the zero valent metal.

31. The method in accordance with claim 28, wherein the substrate further comprises sand.

* * * * *